US010570017B2

(12) United States Patent
Hui

(10) Patent No.: US 10,570,017 B2
(45) Date of Patent: Feb. 25, 2020

(54) YOLK-SHELL-STRUCTURED MATERIAL, ANODE MATERIAL, ANODE, BATTERY, AND METHOD OF FORMING SAME

(71) Applicant: Winsky Technology Hong Kong Limited, Shatin, New Territories (HK)

(72) Inventor: Ka Wai Hui, Shatin (HK)

(73) Assignee: WINSKY TECHNOLOGY HONG KONG LIMITED, Hong Kong (HK)

( * ) Notice: Subject to any disclaimer, the term of this patent is extended or adjusted under 35 U.S.C. 154(b) by 203 days.

(21) Appl. No.: 15/838,852

(22) Filed: Dec. 12, 2017

(65) Prior Publication Data

US 2018/0201512 A1 Jul. 19, 2018

Related U.S. Application Data

(60) Provisional application No. 62/446,698, filed on Jan. 16, 2017.

(51) Int. Cl.
| | | |
|---|---|---|
| *C01B 32/366* | (2017.01) | |
| *C01B 32/15* | (2017.01) | |
| *H01M 4/38* | (2006.01) | |
| *H01M 4/48* | (2010.01) | |
| *C01G 49/06* | (2006.01) | |

(52) U.S. Cl.
CPC ............ *C01B 32/366* (2017.08); *C01B 32/15* (2017.08); *H01M 4/386* (2013.01); *H01M 4/48* (2013.01); *C01G 49/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,466,460 A | * | 11/1995 | McMahon ............. | A01N 25/28 424/408 |
| 5,470,964 A | * | 11/1995 | Qin ......................... | A61L 15/60 427/213.33 |
| 2010/0291224 A1 | * | 11/2010 | Tong ..................... | C08F 263/00 424/496 |
| 2011/0300447 A1 | * | 12/2011 | Archer .................. | B82Y 30/00 429/231.8 |
| 2013/0344391 A1 | * | 12/2013 | Yushin .................. | H01M 4/366 429/231.8 |
| 2014/0113190 A1 | * | 4/2014 | Kong ..................... | H01M 4/366 429/212 |
| 2014/0287317 A1 | * | 9/2014 | Tiquet .................... | C01B 33/02 429/231.8 |
| 2016/0088836 A1 | * | 3/2016 | Sahouani ................ | A01N 25/28 424/497 |
| 2017/0369633 A1 | * | 12/2017 | Caruso Dailey ......... | C08J 3/241 |

* cited by examiner

*Primary Examiner* — Kaity V Chandler
(74) *Attorney, Agent, or Firm* — Ware, Fressola, Maguire & Barber LLP

(57) ABSTRACT

A yolk-shell-structured material (16, 59, 59a, 74) is disclosed as including a plurality of silicon nano-particles (12, 54, 54a, 62) and a cavity (16, 60, 80, 84) enclosed by a micron-sized shell (18, 72) made of carbon nano-particles (14, 56, 58). A method of forming a yolk-shell-structured material with silicon nano-particles (12) and a cavity (16) enclosed by a micron-sized shell (18) made of carbon nano-particles (14) is disclosed as including (a) providing a micron-sized cornstarch core (10), (b) forming a layer of nano silicon-particle (12) on the cornstarch core (10), (c) forming a micron-sized shell (18) of carbon nano-particles (14) on the layer of nano silicon-particle (12), and (d) removing the cornstarch core (10) by heating.

4 Claims, 7 Drawing Sheets

YOLK-SHELL-STRUCTURED MATERIAL, ANODE MATERIAL, ANODE, BATTERY, AND METHOD OF FORMING SAME

BACKGROUND

This invention relates to a yolk-shell-structured material, an anode material incorporating such a yolk-shell-structured material, an anode with such an anode material, a battery with such an anode, and a method of forming same.

SUMMARY

According to a first aspect of the present invention, there is provided a yolk-shell-structured material including a plurality of submicron-sized particles of a first material and at least one cavity enclosed by a micron-sized shell made of a second material which is different from the first material.

According to a second aspect of the present invention, there is provided an anode material including a yolk-shell-structured material including a plurality of submicron-sized particles of a first material and at least one cavity enclosed by a micron-sized shell made of a second material which is different from the first material.

According to a third aspect of the present invention, there is provided an anode with an anode material including a yolk-shell-structured material including a plurality of submicron-sized particles of a first material and at least one cavity enclosed by a micron-sized shell made of a second material which is different from the first material.

According to a fourth aspect of the present invention, there is provided an electric battery with an anode with an anode material including a yolk-shell-structured material including a plurality of submicron-sized particles of a first material and at least one cavity enclosed by a micron-sized shell made of a second material which is different from the first material.

According to a fifth aspect of the present invention, there is provided a method of forming a yolk-shell-structured material including a plurality of submicron-sized particles of a first material and at least one cavity enclosed by a micron-sized shell made of a second material which is different from the first material, including (a) providing a micron-sized core made of a third material, (b) forming at least a layer of submicron-sized particles of the first material on said core, (c) forming at least a micron-sized shell of said second material on said layer of submicron-sized particles of said first material, and (d) removing at least part of said core to form said cavity.

According to a sixth aspect of the present invention, there is provided a method of forming a yolk-shell-structured material including a plurality of submicron-sized particles of a first material and at least one cavity enclosed by a micron-sized shell made of a second material which is different from said first material, including (e) providing a micron-sized composite core made of a plurality of submicron-sized particles of said first material and a third material, (f) forming at least a first layer of particles of said second material on said micron-sized composite core, and (g) removing at least part of said third material of said core to form said cavity.

BRIEF DESCRIPTION OF THE DRAWINGS

Embodiments of yolk-shell-structured materials, anode material with such yolk-shell-structured materials, an anode with such anode materials, a battery with such an anode, and methods of forming such yolk-shell-structured materials according to the present invention will now be described, by way of examples only, with reference to the accompany drawings, in which.

DETAILED DESCRIPTION

Figure 1:
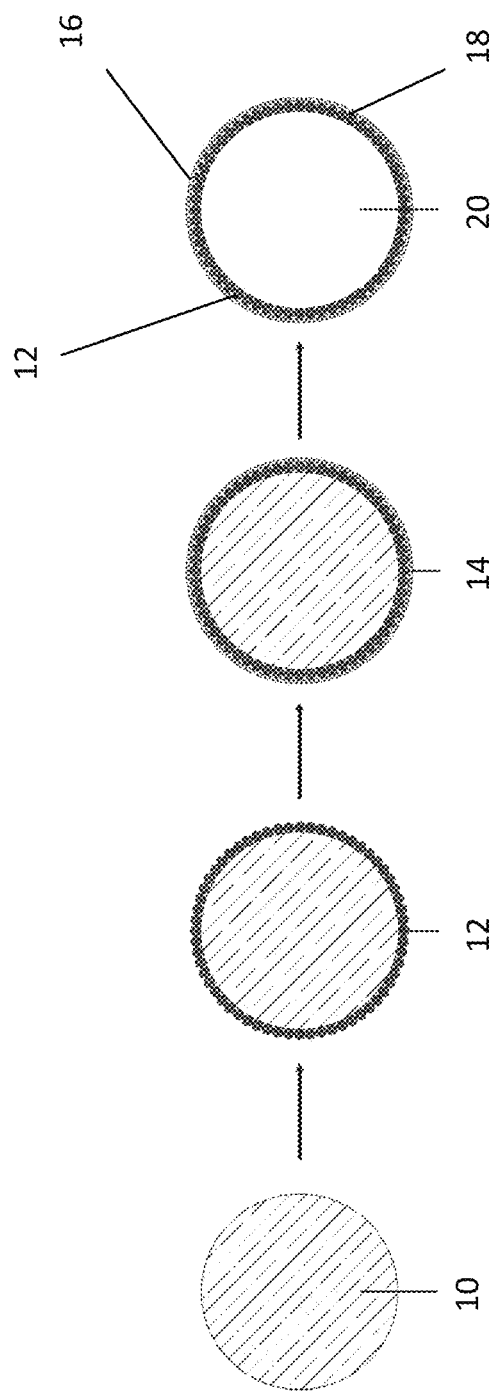
FIG. 1 shows steps of a method of forming a yolk-shell-structured material according to a first embodiment of the present invention.

Referring firstly to FIG. 1, a micron-sized spherical, generally-spherical or ellipsoidal core 10 is provided. The core 10 will be eventually removed by heating at a temperature of up to around 500° C., producing gaseous CO, $CO_2$ and $H_2O$, which escapes to the outside environment during heating. The core 10 is preferably made up of molecules or polymers made of carbon (C), oxygen (O) and hydrogen (H), such as polysaccharides, e.g. cornstarch.

One or more layers of submicron-sized particles, e.g. nano-sized particles (such as spherical amorphous non-sized silicon particles 12 of a size of around 40 nm suitable to act as electro-active materials suitable for making anodes in an electric battery), are coated on the outer surface of the core 10 by means of mechano-fusion, which is a high shear mixing, high energy mixing process. Other mixing methods, such as pistol and mortar, ball milling, or blending mixing, may also be used.

One or more layers of submicron-sized carbon, e.g. carbon nano-particles 14 of a size of around 40 nm, are coated on the outer surface of the nano-sized silicon particles 12 by means of mechano-fusion. Other mixing methods, such as pistol and mortar, ball milling, or blending mixing, may also be used.

The resultant micron-sized material is then heated, such as up to 400° C., to remove the core 10. During heating, CO, $CO_2$ and $H_2O$ gases are produced and escape to the outside environment, leaving a micron-sized yolk-shell-structured material 16 with an outer shell 18 made of the nano-sized carbon particles 14. The outer shell 18 encloses the nano-sized silicon particles 12, which in turn encloses a central hollow cavity 20. To facilitate uniform distribution of the nano-sized carbon particles 14 in the outer surface of the outer shell 18 on the nano-sized silicon particles 12, it is found that the diameter of the outer shell 18 formed by the nano-sized carbon particles 14 should be at least 100 times that of the outer diameter of the nano-sized carbon particles 14.

The micron-sized yolk-shell-structured material 16, with the silicon particles 12 being an electrochemically active material, is suitable for use as an anode material for manufacture of an anode for an electric battery. The micron-sized yolk-shell-structured material 16 possesses gravimetric high energy density and long cycle life. The material 16 possesses the advantages of being an overall micron-sized particle (such as high tap density and processability) and nano-sized active electrochemically active material.

The micron-sized yolk-shell-structured material may be used in different fields of application, including electrode material, electrolyte additives, functional battery separator coating, hydrogen storage, waste treatment, scaffolding for tissues and protein growth, selective permeable membrane, materials separation and purification, catalysts, and pharmaceutical usage. In particular, the outer shell 18 may be poreless (which prevents entry and exit of molecules), porous (which allows entry and exit of molecules) or mesoporous (which allows selective entry and exit of molecules). The transport of molecules may be regulated with the combination of physical and chemical design of the pore.

Figure 2:
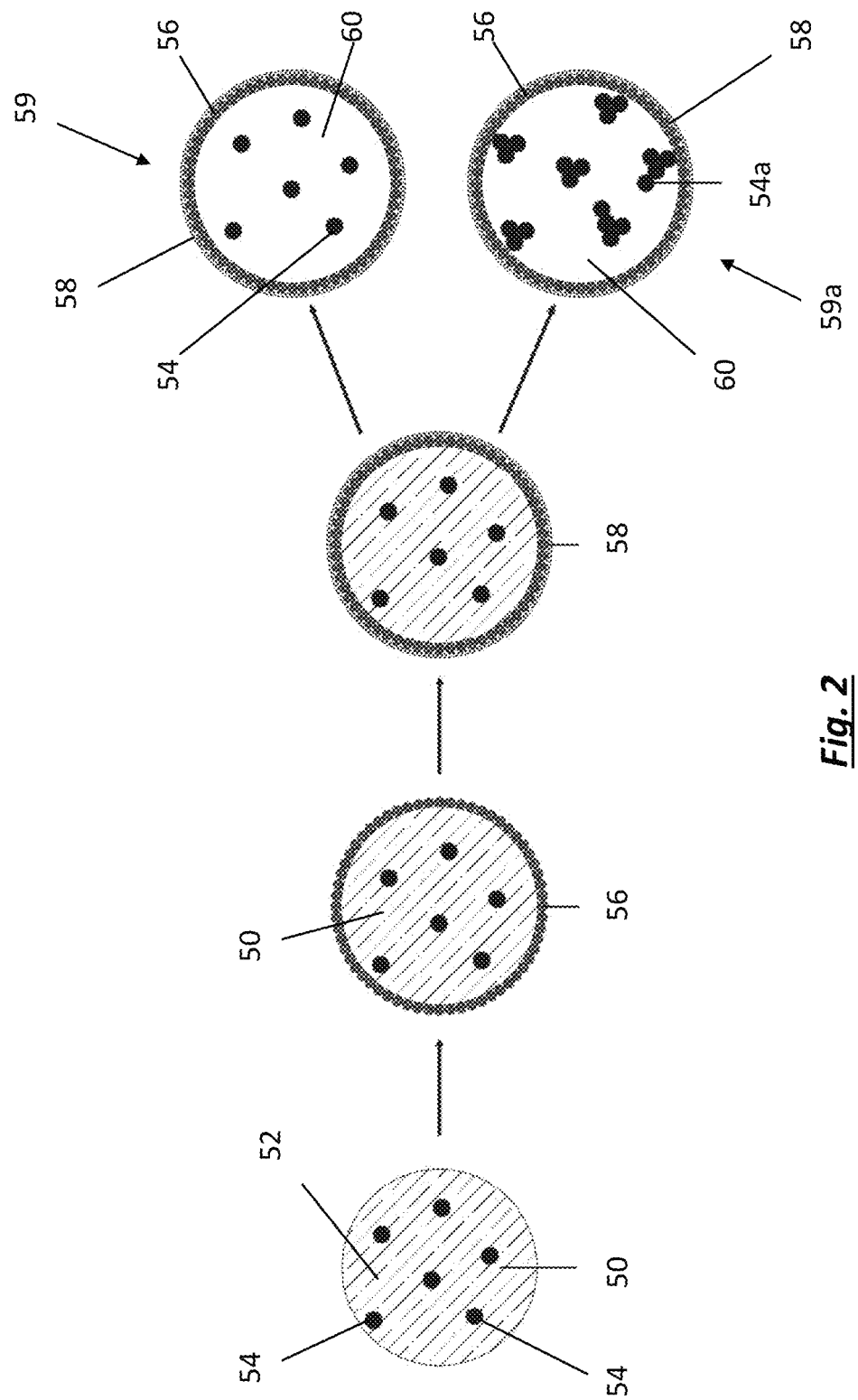
FIG. 2 shows steps of a method of forming a yolk-shell-structured material according to a second embodiment of the present invention.

FIG. 2 shows steps of a further method of forming a yolk-shell-structured material according to the present invention. A micron-sized spherical, generally-spherical or ellipsoidal polymer-nanoparticle composite 50 with a polymer substrate 52 and a plurality of nano-particles 54 is provided. The polymer substrate 52 may be biological polymers, polysaccharide, or crude oil derivatives. The nano-particles 54 may be polymeric, metallic, ceramic, or elemental nano-particles. In particular, the nano-particles 54 may be functional nano-particles, such as ferric species for making magnetic core, or fullerene materials with spin that is MRI active for contrast agent.

One or more layers of nano-particles 56 are coated on the outer surface of the polymer-nanoparticle composite 50 by means of mechano-fusion. Other mixing methods, such as pistol and mortar, ball milling, or blending mixing, may also be used. The nano-particles 56 may be polymeric, metallic, ceramic, or elemental nano-particles. If necessary, one or more further layers of nano-particles 58 are coated on the outer surface of the layer(s) of nano-particles 56 by means of mechano-fusion. Other mixing methods, such as pistol and mortar, ball milling, or blending mixing, may also be used. The nano-particles 56 may be polymeric, metallic, ceramic, or elemental nano-particles. The nano-particles 58 also may be polymeric, metallic, ceramic, or elemental nano-particles.

The material is then heated to remove the polymer substrate 52 of the polymer-nanoparticle composite 50, to form a yolk-shell-structured material 59/59a with a micron-sized outer shell formed of one or more layers of the nano-particles 56 and one or more further layers of the nano-particles 58, with a central hollow cavity 60, and enclosing the nano-particles 54. Depending on the heating process adopted, the nano-particles 54 may be separate from one another, as in the case of the yolk-shell-structured material 59, or may be agglomerated into larger particle clusters 54a, yolk-shell-structured material 59a.

Figure 3:
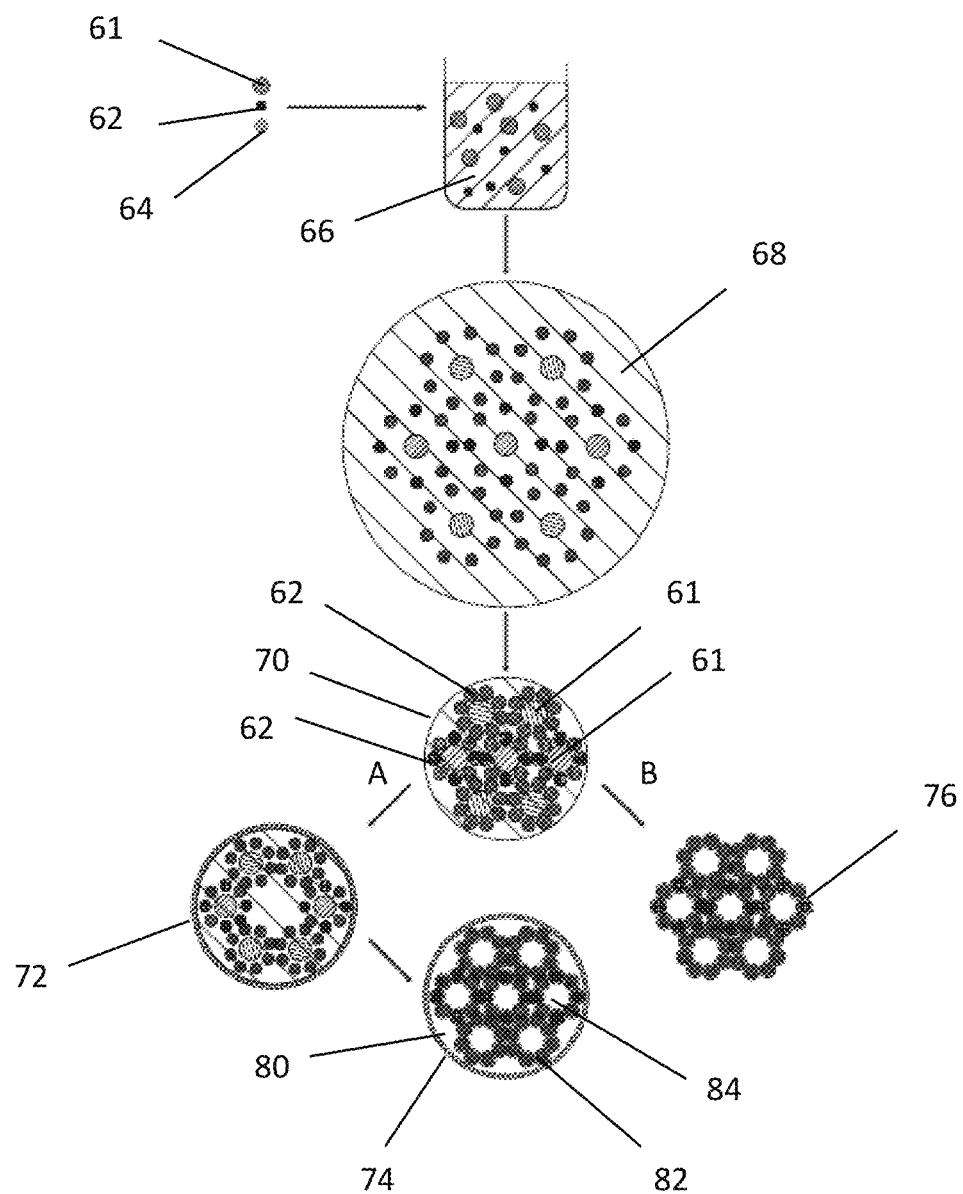
FIG. 3 shows steps of a method of forming a yolk-shell-structured material according to a third embodiment of the present invention.

FIG. 3 shows steps of a further method of forming a yolk-shell-structured material according to the present invention. According to this method,
(a) latex particles 61, of a size between 100 nm and 500 nm, and forming a template for porous structure,
(b) silicon nano-particles 62, of a size of around 40 nm, being an electro-active material for anode of an electric battery, and
(c) a water soluble polymer 64 dissolved in water, which acts as a binder and a carbon source,
are homogenized to form a latex-silicon-polymer dispersion 66. This process homogenizes thermal-dynamically unfavourable but kinetically-stable mixture by high pressure mixing, high shearing mixing, ball milling or sonification.

The latex-silicon-polymer dispersion 66 is then atomized by a spray dryer into dispersion droplets 68, such as by a pressure nozzle, two-fluid nozzle, or centrifugal atomization. The dispersion droplets 68 are then dried in a spray drying tower to remove the water to form spherical or ellipsoidal dried particle composites 70. The drying process is controlled such that the particles in the dried particle composites 70 are allowed to re-arrange themselves into a hierarchical structure in which each of the latex particles 61 is coated with a number of silicon nano-particles 62, and a number of such coated latex particles 61 are grouped into a generally globe-like structure.

In one sub-route A, the dried particle composite 70 is coated with a carbon coating 72 by means of mechano-fusion, to form a protective shell of electrically conductive carbon. Other mixing methods, such as pistol and mortar, ball milling, or blending mixing, may also be used. The conductive carbon forming the carbon coating 72 is of a size of around 40 nm. The conductive carbon forming the carbon coating 72 may be poreless, porous, or mesoporous. The dried particle composite 70 with the carbon coating 72 is then heated, e.g. firstly up to 500° C. in air to remove the latex particles 61 and then up to 3,000° C. in an atmosphere of an inert gas, a reducing gas, or a mixture thereof, to carbonize the polymer 64, thus forming a porous hierarchical silicon anode material 74 with conductive pathways (formed by the electrically conductive carbon, both of the carbon coating 72 and the carbonized polymer 64) connecting the individual silicon nano-particles 62. The carbon coating 72 forms an outer shell enclosing the silicon nano-particles 62 and the carbonized polymer 64 in a central cavity 80. The silicon nano-particles 62 and carbonized polymer 64 also form a number of globe-like structure 82 each enclosing a central cavity 84. The inert gas may be any type of gas or mixture of gases that replaces oxygen, so as to prevent the formation of carbon oxides gas during heating. The carbon atoms may then re-arrange themselves to form a crystalline structure which is a more electrically conductive alignment. The inert gas may be nitrogen, argon, helium, or a mixture of any two or more of these gases. The reducing gas may be hydrogen, carbon monoxide or a mixture of them.

In one possible heating process, the dried particle composite 70 with the carbon coating 72 is loaded into a ceramic container (a kiln), which is fed into a multi-zone tunnel convectional furnace. The temperature, exhaust and atmosphere of each zone in the multi-zone tunnel convectional furnace can be independently adjusted. A conveyor belt is provided to transport the kiln containing the composite 70 from zone to zone in the multi-zone tunnel convectional furnace. The speed of movement of the conveyor belt will determine how long the kiln will remain in each of the zones of the furnace.

When the dried particle composite 70 enters the furnace, the first several zones are set at a temperature of between 150° C. to 500° C. Ambient air is fed into these zones so as to remove the latex particles 61 by heating. These zones are provided with multiple exhaust to remove the by-product gases, such as water vapor and carbon-containing gases. The kiln is subsequently moved into zones deeper into the convectional furnace. Such zones deeper in the convectional furnace are set at a temperature between 700° C. to 3,000° C., so as to carbonize the polymer 64. An inert gas (e.g. nitrogen, argon, helium, or a mixture of any two or more of these gases), a reducing gas (e.g. hydrogen, carbon monoxide, or a mixture of these gases), or a mixture of these gases, is fed into these zones.

In another possible heating process, the dried particle composite 70 is first heated in a box-type oven up to 500° C. to remove the latex particles 61. The so-heated composite 70 is then allowed to cool down to below 70° C., which is then transferred to a box-type furnace and heated up to 3,000° C. to carbonize the polymer 64.

In an alternative sub-route B, the dried particle composite 70 is heated, e.g. up to 500° C. to remove the latex particles 61 and then up to 3,000° C. to carbonize the polymer 64, thus forming a shell-less porous hierarchical silicon anode material 76 with conductive pathways (formed by the electrically conductive carbon of the carbonized polymer 64) connecting the individual silicon nano-particles 62.

Example 1

Figure 4:
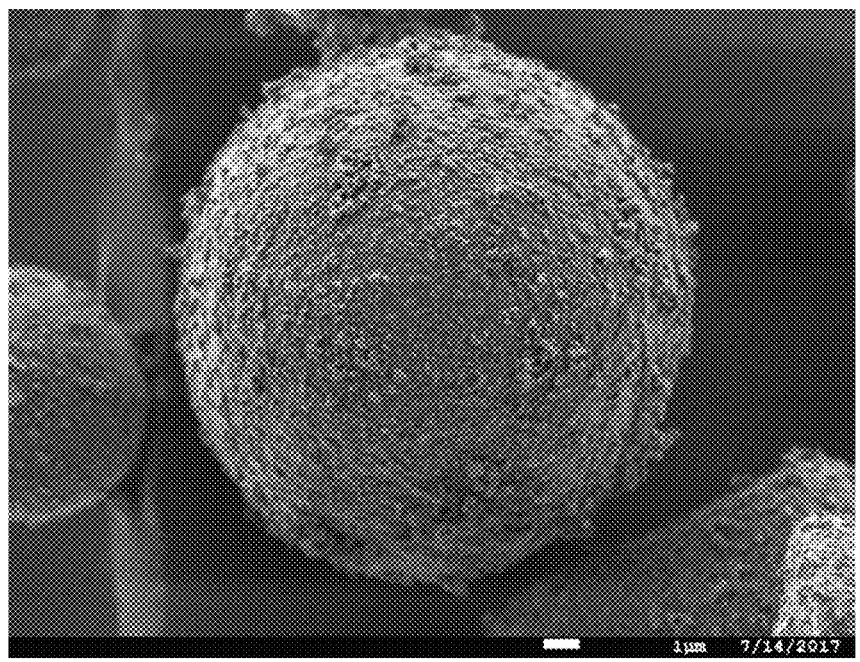
FIG. 4 is a scanning electronic microscope (SEM) image of a particle with a cornstarch core and a silicon (Si) nano-particle (80 nm)/carbon (C) shell.
Figure 5:
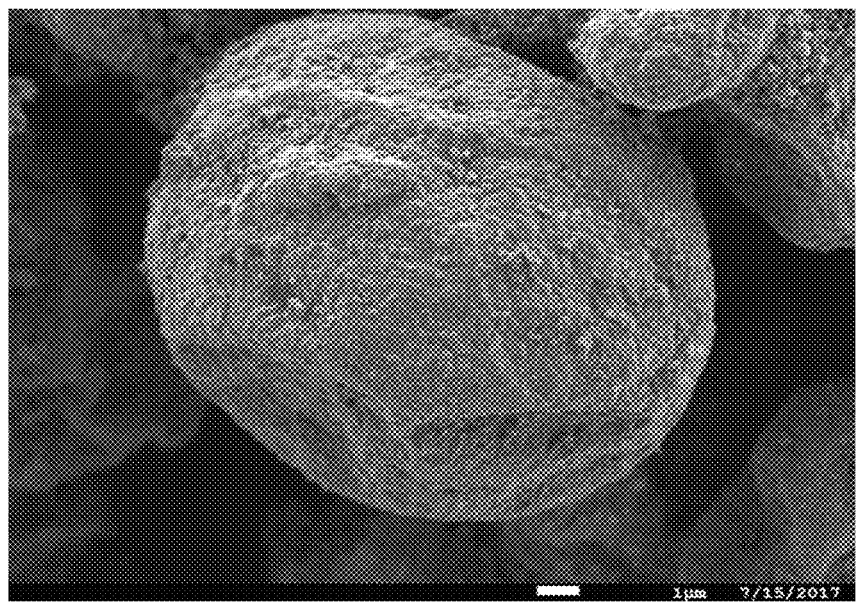
FIG. 5 is an SEM image of the particle of FIG. 4 after removal of the cornstarch core by thermal treatment.
Figure 6:
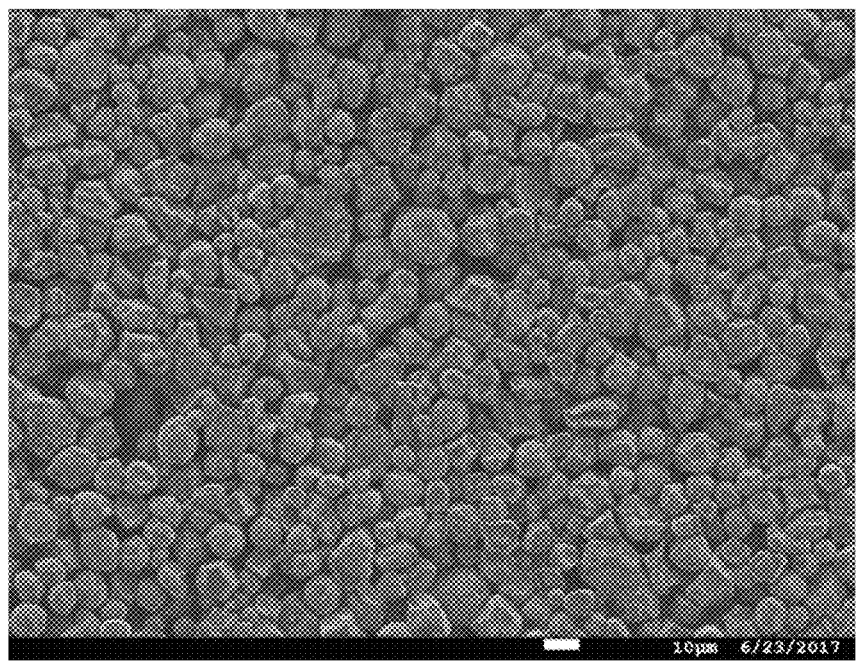
FIG. 6 is an SEM image of an electrode made of the thermally-treated particle with silicon (Si) nano-particle (80 nm)/carbon (C) shell of FIG. 5.

Silicon (Si) nano-particles were deposited onto cornstarch via mechano-fusion to yield a Si-coated cornstarch. Carbon nano-particles were then coated onto the Si-coated cornstarch via mechano-fusion to yield an outer shell made of such carbon nano-particles. The cornstarch was removed with a heat treatment up of to 300° C. for up to 24 hours to yield a hollow yolk-shell structure. The cornstarch had an average diameter of 2-30 μm, preferably 10 μm. The silicon nano-particles had an average diameter of 40-150 nm, preferably 40-80 nm. The silicon nano-particles were up to 50 wt % relative to the cornstarch. The carbon nano-particles had an average diameter of 30-50 nm, preferably 35 nm. The carbon nano-particles forming the outer shell were up to 50 wt % relative to silicon nano-particles. The mechano-fusion was carried out by high energy ball milling, high energy mixing, or preferably in a mechano-fusion machine. FIG. 4 is a scanning electronic microscope (SEM) image of a particle with a cornstarch core and a silicon (Si) nano-particle (80 nm)/carbon (C) shell. The heating treatment composed of three heating stages up to 500° C. under air or a protective gas. A yolk-shell-structured material was then formed. FIG. 5 is an SEM image of the particle of FIG. 4 after removal of the cornstarch core by thermal treatment. A hollow carbon/silicon anode comprising such a yolk-shell-structured material with 10 wt % 80 nm silicon nano-particles loading had a reversible capacity of 704 mAh/g. FIG. 6 is an SEM image of an electrode made of the thermally-treated particle with a silicon (Si) nano-particle (80 nm)/carbon (C) shell of FIG. 5.

Example 2

Silicon nano-particles were mixed with carbon nano-particles (up to 1:1 volume ratio) and were deposited onto a cornstarch core via mechano-fusion to yield a Si—C-coated cornstarch structure. Carbon nano-particle were then coated onto the Si—C-coated cornstarch structure via mechano-fusion. The cornstarch core was removed by heat treatment at a temperature of up to 300° C. for up to 24 hours to yield a hollow yolk-shell structure. The cornstarch particles had an average diameter of 2-30 μm, preferably 10 μm. The silicon nano-particles had an average diameter of 40-150 nm, preferably 40-80 nm. The silicon nano-particles in the carbon nano-particles coated Si—C-coated cornstarch structure were up to 50 wt % relative to the cornstarch core. The carbon nano-particles had an average diameter of 30-50 nm, preferably 35 nm. The carbon nano-particles in the carbon nano-particles coated Si—C-coated cornstarch structure were up to 50 wt % relative to silicon nano-particles. The mechano-fusion was carried out by high energy ball milling, high energy mixing, or preferably in a mechano-fusion machine. The heating treatment composed of three heating stages up to 500° C. under air or a protective gas.

Example 3

Adopting the method schematically shown in FIG. 2, silicon nano-particles 56 were deposited onto the polymer composite 50 which contains solid particles via mechano-fusion to yield a Si-coated polymer composite 58. Carbon nano-particles 58 were coated onto the Si-coated polymer composite via mechano-fusion. The polymer substrate 52 was removed with a heat treatment of up to 500° C. for up to 24 hours to yield a hollow space 60. Depending on the temperature profile and the nature of the solid particles 54 within the polymer composite, the degree of aggregation of solid particles within the hollow space could differ. The polymer composite 50 had an average diameter of 10-1000 μm, preferably 10 μm. The silicon nano-particles 56 had an average diameter of 40-150 nm, preferably 40-80 nm. The silicon nano-particles 56 were up to 50 wt % relative to polymer substrate 52. The carbon nano-particles 58 had an average diameter of 30-50 nm, preferably 35 nm. The carbon nano-particles 58 were up to 50 wt % relative to silicon nano-particles 56. The mechano-fusion was carried out by high energy ball milling, high energy mixing, or preferably in a mechano-fusion machine. The heating treatment composed of three heating stages up to 500° C. under air or a protective gas.

Example 4

Figure 7:
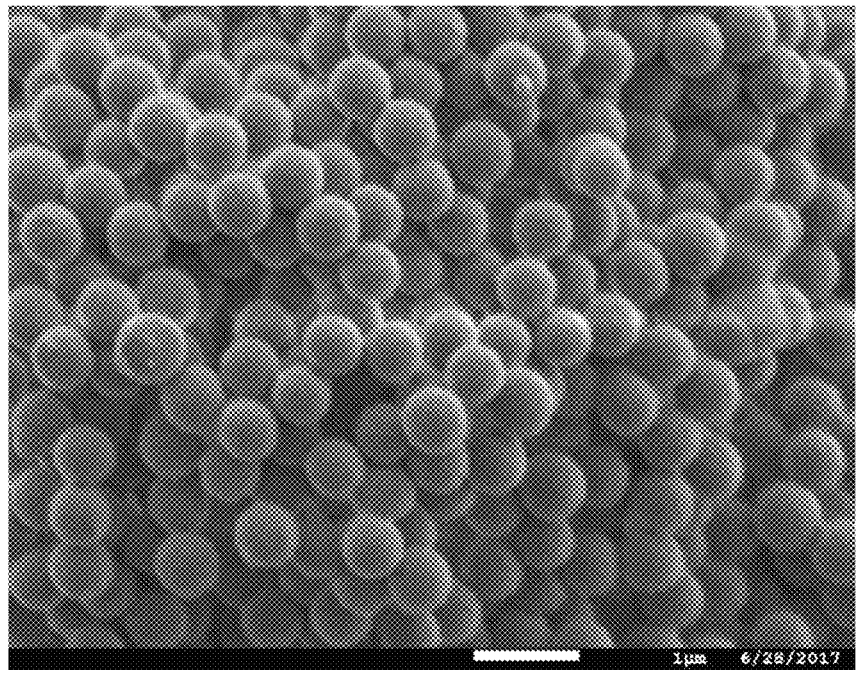
FIG. 7 is an SEM image of a number of polymethylmethacrylate (PMMA) particles, being water insoluble microspheres.

Silicon nano-particles, carbon nano-particles, a water soluble polymer and water insoluble micro-spheres were mixed and dispersed in water via sonication, mechanical mixing, high pressure homogenizer, or high speed homogenizer to yield a homogeneous dispersion. The dispersion was fed into a spray dry to form small dispersion droplets from the spray nozzle and dried in a drying tower to form a particle composite. The particle composite contained the silicon nano-particles, the carbon nano-particle, the water soluble polymer and the water insoluble microspheres assembled into a hierarchical structure. Two alternative further processes could be applied to the particle composite. In a first possible process, the particle composite was coated with carbon nano-particles via mechano-fusion. The water insoluble microspheres were removed via low temperature heat treatment and the water soluble polymer was carbonized with high temperature heat treatment to yield a hierarchical structure with discrete hollow space with a carbon shell. In a second possible process, the insoluble microspheres were removed via low temperature heat treatment and the water soluble polymer was carbonized with high temperature heat treatment to yield a hierarchical structure with discrete hollow space. The silicon nano-particles had an average diameter of 40-150 nm, preferably 40-80 nm. The silicon nano-particles were up to 95 wt % relative to the total solid. The carbon nano-particle had an average diameter of 30-50 nm, preferably 35 nm. The carbon nano-particles were up to 50 wt % relative to silicon nano-particles. The water soluble polymer could be sodium carboxymethyl cellulose, polyvinyl alcohol, or dextran. The water insoluble microspheres could be polystyrene (PS) or polymethylmethacrylate (PMMA). FIG. 7 is an SEM image of a number of polymethylmethacrylate (PMMA) particles, being water insoluble microspheres. The mechano-fusion was carried out by high energy ball milling, high energy mixing, or in a mechanofusion machine. The low temperature heating treatment composed of three heating stages up to 500° C. under air or a protective gas. Carbonization was carried out by heat treatment under a protective gas at a temperature up to 1,200° C.

It should be understood that the above only illustrates examples whereby the present invention may be carried out, and that various modifications and/or alterations may be made thereto without departing from the spirit of the invention. It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A method of forming a yolk-shell-structured anode material including a plurality of submicron-sized particles of a first material and at least one cavity enclosed by a micron-sized shell made of a second material which is different from the first material, method comprising:
   (a) providing a micron-sized core made of a third material including at least a polysaccharide,
   (b) forming at least a layer of submicron-sized particles of said first material on said core,
   (c) forming at least a micron-sized shell of said second material on said layer of submicron-sized particles of said first material, and
   (d) removing at least part of said core to form said cavity.

2. The method according to claim 1, wherein said polysaccharide is corn starch.

3. The method according to claim 1, wherein said step (b) and/or said step (c) is carried out by mechano-fusion, pistol and mortar, ball milling and/or blending mixing.

4. The method according to claim 1, wherein said step (d) is carried out by heating to a temperature of up to 500° C.

* * * * *